United States Patent
Torres Olvera

(10) Patent No.: US 9,834,073 B1
(45) Date of Patent: Dec. 5, 2017

(54) TWO-ZONE ADJUSTABLE SUNROOF SHADE

(71) Applicant: FORD GLOBAL TECHNOLOGIES, LLC, Dearborn, MI (US)

(72) Inventor: Andres Torres Olvera, Amp. Las Aguilas (MX)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/223,898

(22) Filed: Jul. 29, 2016

(51) Int. Cl.
- *B60J 3/00* (2006.01)
- *B60J 7/00* (2006.01)
- *B60J 7/02* (2006.01)

(52) U.S. Cl.
CPC .............. *B60J 7/0007* (2013.01); *B60J 3/00* (2013.01); *B60J 7/02* (2013.01)

(58) Field of Classification Search
CPC .................................. B60J 7/0007; B60J 3/00
USPC ....................................................... 296/214
See application file for complete search history.

(56) References Cited

U.S. PATENT DOCUMENTS

| | | | |
|---|---|---|---|
| 4,161,336 A | 7/1979 | LeVan et al. | |
| 4,272,122 A * | 6/1981 | Schatzler | B60J 7/003 296/213 |
| 4,674,789 A | 6/1987 | Watjer et al. | |
| 6,065,793 A | 5/2000 | Koshida et al. | |
| 6,179,034 B1 * | 1/2001 | Fuss | B60J 7/003 160/105 |

FOREIGN PATENT DOCUMENTS

| | | |
|---|---|---|
| FR | 2913920 B1 | 6/2009 |
| FR | 2942176 B1 | 3/2011 |
| JP | 4234091 B2 | 3/2009 |

OTHER PUBLICATIONS

English Machine Translation of FR2913920B1.
English Machine Translation of FR2942176B1.
English Machine Translation of JP4234091B2.

* cited by examiner

*Primary Examiner* — Dennis H Pedder
(74) *Attorney, Agent, or Firm* — Vichit Chea; King & Schickli PLLC

(57) ABSTRACT

A dual zone shade assembly for a vehicle sunroof, moonroof, or panoramic roof, includes a central sliding shade guide and a pair of sliding shade panels all configured for sliding movement independently of one another. A latch assembly is provided, configured for independently engaging or releasing each of the pair of sliding shade panels and/or the central sliding shade guide.

15 Claims, 3 Drawing Sheets

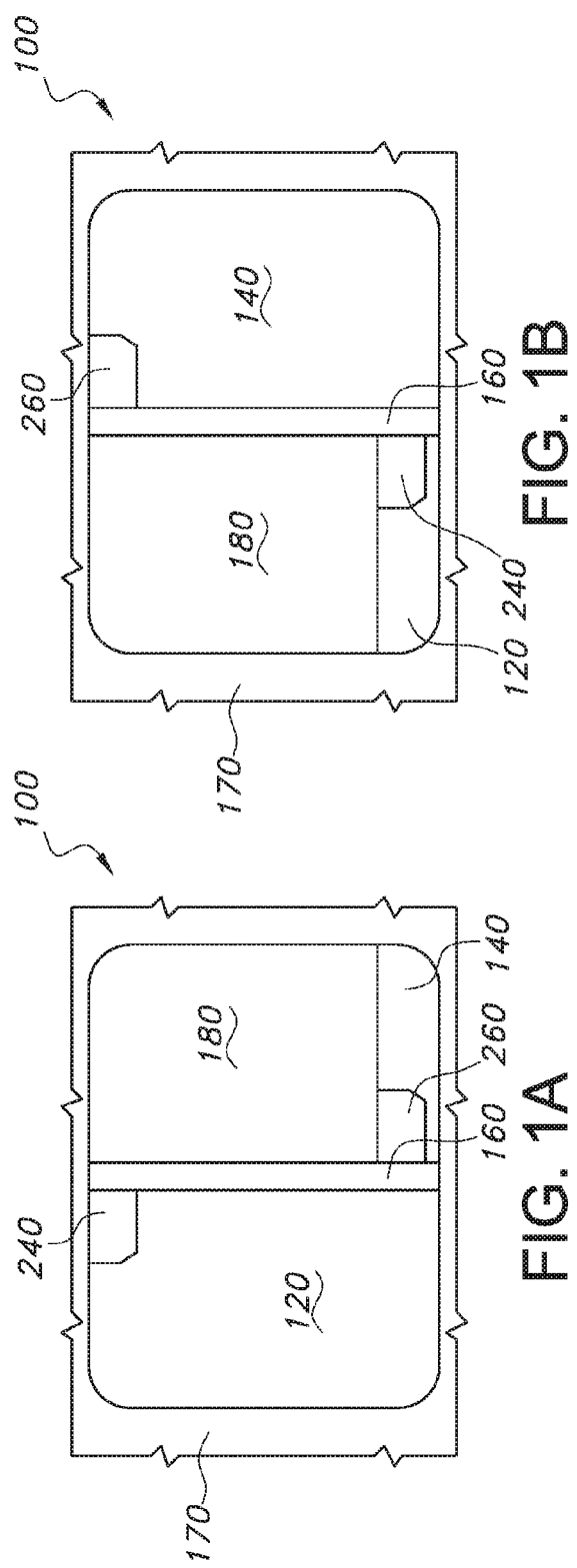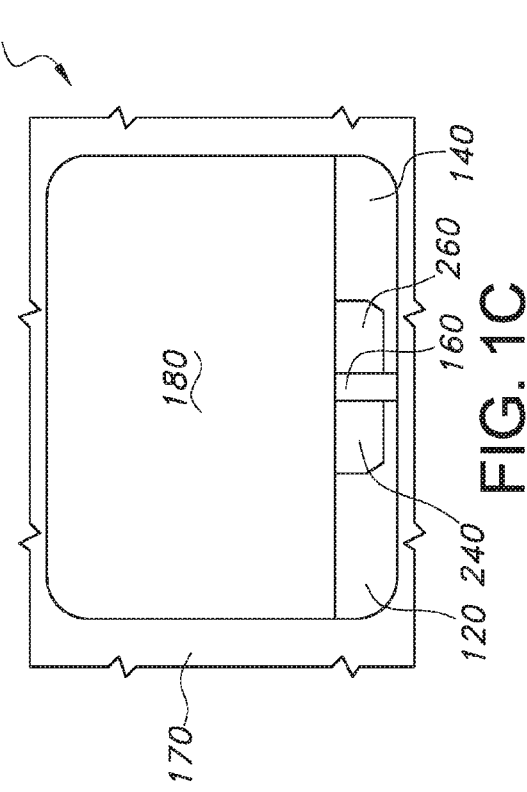

TWO-ZONE ADJUSTABLE SUNROOF SHADE

TECHNICAL FIELD

This disclosure relates generally to sunroofs for motor vehicles, and more particularly to a sunroof shade structure including independently operable portions.

BACKGROUND

It is known to provide sunroofs, moonroofs, etc., typically being fixed or sliding panels selectively occluding an aperture defined through a vehicle roof panel and headliner. By selectively opening/closing same, a user is able to regulate an amount of ambient air allowed into the vehicle passenger cabin. Similar structures and functions are provided for vehicle panoramic roof mechanisms.

Many sunroofs/moonroofs are defined by a fixed frame holding one or more panels of safety glass, and by default allow passage of most if not all ambient light therethrough. Therefore, modern fixed sunroof/moonroof assemblies are often also provided with a sliding shade to allow selectively regulating an amount of ambient light allowed into the passenger cabin. Such shades may be a light transmission-reducing panel interposed between the passenger cabin interior and the sunroof/moonroof closure and configured for sliding translation between a fully open position and a fully closed position along a shade guide element associated with the sunroof/moonroof frame and/or the vehicle headliner. The shade may be fabricated of a variety of materials allowing different levels of light to pass through, such as fully opaque materials which completely block the passage of light, partially opaque materials, polarizing materials, etc.

Typically a sunroof/moonroof shade is unitary structure, i.e. is a single panel or unit which can be opened or closed to completely reveal or to completely cover the sunroof/moonroof. Thus, all occupants of the vehicle must agree as to the disposition of the shade and the amount of light allowed through the sunroof/moonroof. No mechanism exists currently for a shade having selectively actuable portions, whereby for example an increased transmission of light is allowed to a passenger's side of the vehicle compared to a lesser transmission of light allowed to a driver's side of the vehicle.

To solve these and other problems, the present disclosure relates to a dual zone sunroof/moonroof shade assembly for a vehicle. Advantageously, both zones of the shade may be opened/closed as a unit similar to conventional shades, but also either zone of the described assembly may be selectively opened/closed separately of the other zone to tailor the amount of light allowed into one or both of a driver's side and a passenger's side of the vehicle.

SUMMARY

In accordance with the purposes and benefits described herein, in one aspect of the present disclosure a dual zone shade assembly for a vehicle sunroof, moonroof, or panoramic roof is provided, comprising a central sliding shade guide and a pair of sliding shade panels all configured for sliding movement independently of one another. The central sliding shade guide comprises a pair of opposed guide channels configured for slidingly receiving an edge of each of the pair of sliding shade panels therein. A latch assembly is provided, configured for independently engaging or releasing each of the pair of sliding shade panels and/or the central sliding shade guide.

In embodiments, the latch assembly comprises a pair of latches each respectively associated with a one of the pair of sliding shade panels and disposed to releasably engage cooperating apertures defined in a first end of the central sliding shade guide. The latch assembly may further include a sliding shade panel lock pin disposed at an opposed second end of the central sliding shade guide. In use, the sliding shade panel lock pin is urged to engage a one of the pair of sliding shade panels when the other of the pair of sliding shade panels is translated to a fully open configuration.

In another aspect, a motor vehicle sunroof, moonroof, or panoramic roof assembly is provided, including the dual zone shade assembly described above.

In the following description, there are shown and described embodiments of the disclosed dual zone sunroof/moonroof shade assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed dual zone sunroof/moonroof shade assembly, and together with the description serve to explain certain principles thereof. In the drawing:

FIG. 1A depicts a dual zone sliding shade assembly according to the present disclosure, having a passenger's side shade in a retracted configuration;

FIG. 1B depicts the dual zone sliding shade assembly of FIG. 1A, having a driver's side shade in a retracted configuration;

FIG. 1C depicts the dual zone sliding shade assembly of FIG. 1A, having both shades in a retracted configuration;

Figure 3:
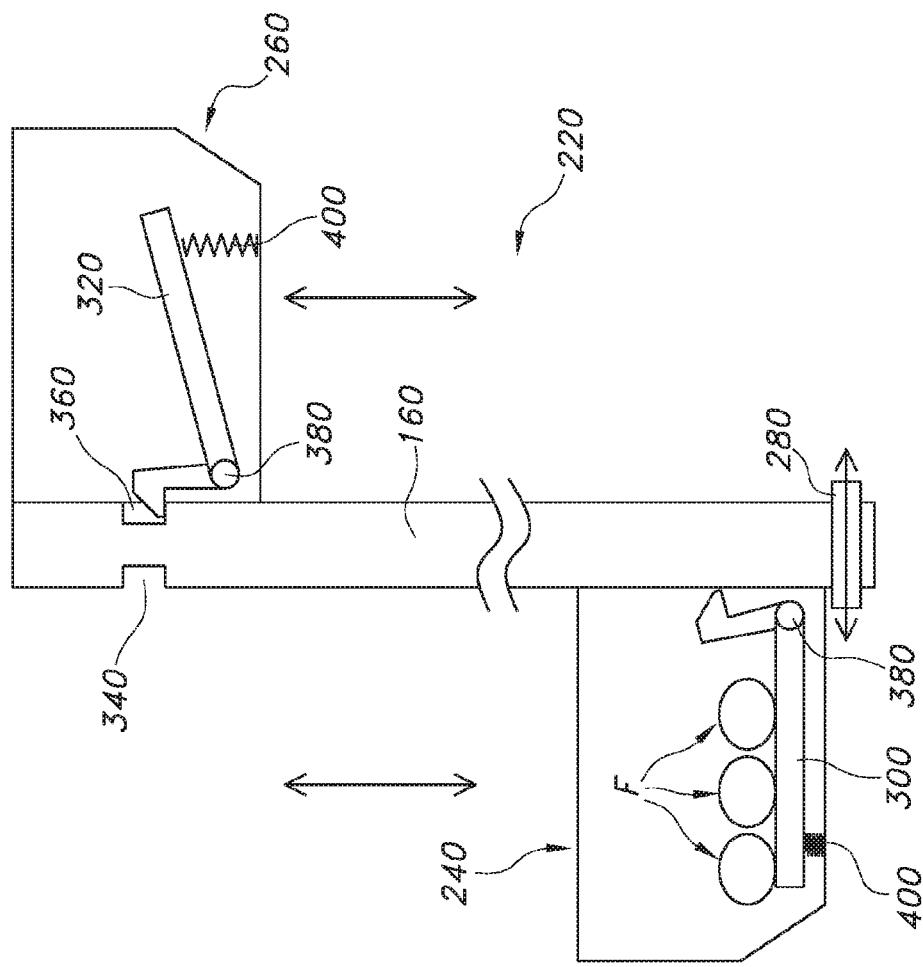
FIG. 3 depicts a latch assembly for the dual zone sliding shade assembly according to the present disclosure.

Reference will now be made in detail to embodiments of the disclosed dual zone sunroof/moonroof shade assembly, examples of which are illustrated in the accompanying drawing figures.

DETAILED DESCRIPTION

Preliminarily, the present disclosure primarily describes a manually operated dual zone shade assembly associated with a vehicle sunroof. However, the skilled artisan will appreciate from the disclosure that the described system is readily adaptable to automatically operated/motorized embodiments, and that the assembly can easily be adapted to other like roof structures, i.e. moonroofs, panoramic roofs, etc. Accordingly, the descriptions and drawings that follow will not be taken as limiting in regard to the above-described features.

With reference to FIGS. 1A-1C, at a high level the present disclosure is directed to a dual zone shade assembly 100 including a left side sliding shade panel 120, a right side sliding shade panel 140, and a sliding shade guide 160 bisecting the two. As shown in the drawings and as will be described in greater detail below, each the left side sliding shade panel 120, right side sliding shade panel 140, and sliding shade guide 160 are configured whereby each can be translated from a fully closed position into a recess (not shown) provided in the vehicle roof panel and/or headliner 170. By the described arrangement, either sliding shade panel 120, 140 may be retracted independently of the other (see FIGS. 1A, 1B). In turn, if desired both the sliding shade panels 120, 140 and the sliding shade guide 160 may be so retracted, fully revealing the vehicle sunroof/moonroof 180. As will be appreciated, this arrangement permits vehicle occupants to allow a greater transmission of ambient light independently to the driver's side (FIG. 1A), to the passenger's side (FIG. 1B), or to both sides (FIG. 1C) of the vehicle.

Figure 2:
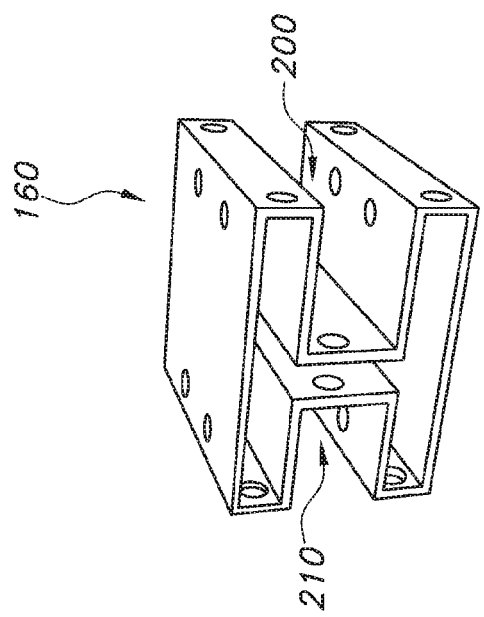
FIG. 2 depicts a sliding shade guide according to the present disclosure.

In an embodiment (see FIG. 2), the sliding shade guide 160 is configured to include a pair of opposed shade guide channels 200, 210 dimensioned for slidingly receiving an edge of the left side sliding shade panel 120 and right side sliding shade panel 140 therein. As depicted, the sliding shade guide 160 defines an I-beam shape in cross-section, although other configurations providing the needed opposed shade guide channels are possible and are contemplated.

To accomplish the above-described functions, a latch assembly 220 is provided (see FIG. 3), comprising a left side latch mechanism 240 and a right side latch mechanism 260. The latch assembly 220 further includes a sliding shade panel lock pin 280.

In the depicted embodiment, the left side and right side latch mechanism 240, 260 each include a spring-loaded pivoting latch 300, 320 adapted to engage cooperating apertures 340, 360 disposed at a first end of the sliding shade guide 160. In the fully closed position as shown for sliding shade panel 260, the spring-loaded latch 320 is urged forwardly to engage its cooperating aperture 360. The spring-loaded latches 300, 320 as depicted are birds-beak latches of substantially known design, disposed to rotate about a pivot point 380 and urged to engage a cooperating aperture 340, 360 by a coil spring 400. However, alternative configurations of latch suitable for the present latch mechanisms 240, 260 are known in the art and contemplated for use herein.

In use, a user (depicted generally by fingers F) need only grasp a desired latch mechanism 240 or 260 whereby the grasped pivoting latch 300 or 320 is urged to disengage from its cooperating aperture 340, 360, and pull the desired sliding shade panel 120, 140 vehicle-rearwardly to the desired opened configuration. The process would be repeated to retract the other sliding shade panel. Because the sliding shade guide 160 includes apertures 340, 360 at the first end thereof, once the desired sliding shade panel 120, 140 is disengaged as described infinite open positions are possible between the fully closed position and the fully open position.

When a particular sliding shade panel (not shown in this view) reaches the fully open position, it contacts the sliding shade panel lock pin 280, urging it laterally to engage and lock the other sliding shade panel by way of a lock pin aperture (not visible in this view) provided in each sliding shade panel. Advantageously, this provides a mechanism for retracting the sliding shade guide 160. Because the sliding shade guide 160 has engaged a sliding shade panel by way of the lock pin 280, when a user retracts that sliding shade panel the sliding shade guide is also retracted (see FIG. 4). Thus, the vehicle sunroof/moonroof (not shown) is fully exposed.

Figure 4:
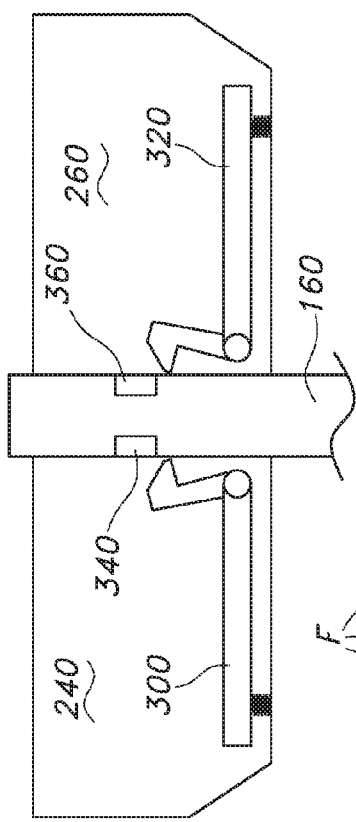
FIG. 4 depicts the dual zone sliding shade assembly of FIG. 1A wherein the sliding shade guide is in a retracted position.

In the fully retracted configuration shown in FIG. 4, as shown the sliding shade guide 160 does not retract sufficiently to cause the spring-loaded latches 300, 320 to re-engage the apertures 340, 360. Likewise, because of the engagement of the sliding shade panel lock pin 280 as described above, it will be appreciated that the sliding shade guide 160 cannot be urged back to the closed configuration of FIG. 3 without concurrently sliding at least one of the sliding shade panels 120, 140 to the closed configuration.

Figure 5A:
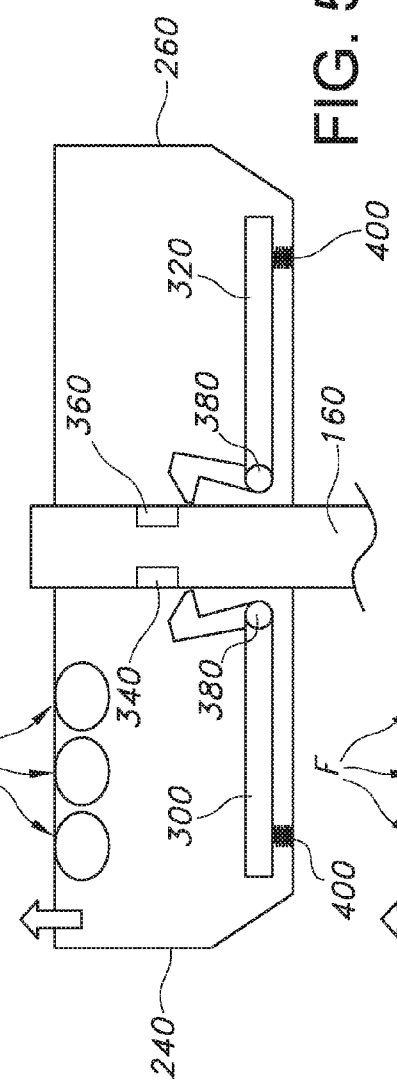
FIG. 5A shows a pair of latch mechanisms according to the present disclosure prior to returning a pair of sliding shade panels and a sliding shade guide to a closed position.
Figure 5B:
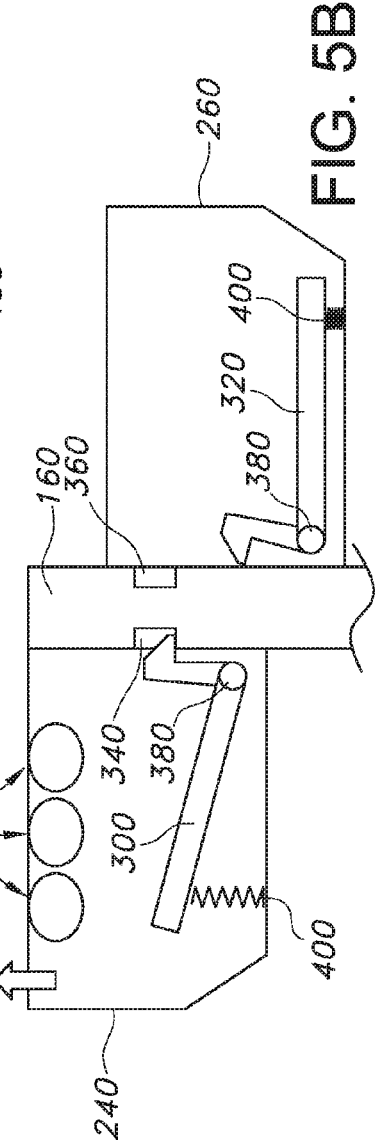
FIG. 5B shows one of the latch mechanisms of FIG. 5A engaging the sliding shade guide to return both to a closed position.

To slide one or both of the sliding shade panels 120, 140 towards the closed configuration, as shown in FIGS. 5A and 5B a user need only grasp the desired latch mechanism 240, 260 and urge the associated sliding shade panel vehicle-forwardly towards the closed position (see arrows). After a short path of travel, the respective pivoting latch 300, 320 re-engages its cooperating aperture 340, 360, thereby causing the particular sliding shade panel 240, 260 and the sliding shade guide 160 to slidingly translate towards the closed position. If this process is performed concurrently for both sliding shade panels 120, 140, both shade panels and the sliding shade guide 160 will be translated towards the closed position. If the process is performed only for one sliding shade panel 120 or 140, only that sliding shade panel and the sliding shade guide 160 will be translated towards the closed position. The other sliding shade panel 120 or 140 will still be able to slide freely along the sliding shade guide as desired.

As will be appreciated, by the above-described shade assembly 100 a dual zone mechanism is provided, allowing each side of the shade assembly to be independently operated. Thus, for example, the sliding shade panels 120, 140 are independently operable to allow more or less light to, for example, a passenger's side and a driver's side of a vehicle including the assembly. In turn, because of the independently sliding central sliding shade guide 160, the entire shade assembly 100 can be retracted and/or returned to the closed position, allowing the entire assembly to function as a substantially conventional unitary shade.

Obvious modifications and variations are possible in light of the above teachings. All such modifications and variations are within the scope of the appended claims when interpreted in accordance with the breadth to which they are fairly, legally and equitably entitled.

What is claimed:

1. A dual zone shade assembly for a vehicle sunroof, moonroof, or panoramic roof, comprising a central sliding shade guide and a pair of sliding shade panels;
    wherein the pair of sliding shade panels each includes a latch adapted to engage the sliding shade guide and each of the pair of sliding shade panels are adapted to engage a sliding shade panel lockpin to allow retraction of the sliding shade guide.

2. The assembly of claim 1, wherein the central sliding shade guide comprises a pair of opposed guide channels configured for slidingly receiving an edge of each of the pair of sliding shade panels therein.

3. The assembly of claim 1, wherein each latch of the pair of sliding shade panels is disposed to releasably engage cooperating apertures defined in a first end of the sliding shade guide.

4. The assembly of claim 3, wherein the sliding shade panel lock pin is disposed at a second end of the central sliding shade guide.

5. The assembly of claim 4, wherein the sliding shade panel lock pin is urged to engage a one of the pair of sliding shade panels when the other of the pair of sliding shade panels is translated to a fully open configuration.

6. A motor vehicle including the assembly of claim 1.

7. A dual zone shade assembly for a vehicle sunroof, moonroof, or panoramic roof, comprising:
   a central sliding shade guide; and
   a pair of sliding shade panels;
   wherein the pair of sliding shade panels each includes a latch adapted to engage cooperating apertures defined in a first end of the sliding shade guide and each of the pair of sliding shade panels are adapted to engage a sliding shade panel lockpin to allow retraction of the sliding shade guide;
   further wherein the sliding shade panel lock pin is disposed at a second end of the central sliding shade guide and is adapted to be urged to engage a one of the pair of sliding shade panels when the other of the pair of sliding shade panels is translated to a fully open configuration.

8. The assembly of claim 7, wherein the central sliding shade guide comprises a pair of opposed guide channels configured for slidingly receiving an edge of each of the pair of sliding shade panels therein.

9. A motor vehicle including the assembly of claim 7.

10. A motor vehicle sunroof, moonroof, or panoramic roof assembly, comprising:
    a sunroof, moonroof, or panoramic roof shade guide element; and
    a dual zone shade assembly, comprising a sliding shade guide bisecting the shade guide element and a pair of sliding shade panels;
    wherein the pair of sliding shade panels each includes a latch adapted to engage the sliding shade guide and each of the pair of sliding shade panels are adapted to engage a sliding shade panel lockpin to allow retraction of the sliding shade guide.

11. The assembly of claim 10, wherein the sliding shade guide comprises a pair of opposed guide channels configured for slidingly receiving an edge of each of the pair of sliding shade panels therein.

12. The assembly of claim 10, wherein each latch of the pair of sliding shade panels is disposed to releasably engage cooperating apertures defined in a first end of the sliding shade guide.

13. The assembly of claim 12, wherein the sliding shade panel lock pin is disposed at a second end of the sliding shade guide.

14. The assembly of claim 13, wherein the sliding shade panel lock pin is urged to engage a one of the pair of sliding shade panels when the other of the pair of sliding shade panels is translated to a fully open configuration.

15. A motor vehicle including the assembly of claim 10.

* * * * *